United States Patent [19]

Dauga

[11] 4,029,256
[45] June 14, 1977

[54] THERMOSTATIC MIXER VALVE

[75] Inventor: Bernard Dauga, Seichamps, France

[73] Assignee: Pont-A-Mousson S.A., Nancy, France

[22] Filed: Dec. 19, 1975

[21] Appl. No.: 642,633

[30] Foreign Application Priority Data

Dec. 20, 1974 France .............................. 74.42270

[52] U.S. Cl. ............................................ 236/12 R
[51] Int. Cl.² ................. G05D 11/16; G05D 23/13
[58] Field of Search ............... 236/12 R; 137/625.4, 137/90; 138/39

[56] References Cited

UNITED STATES PATENTS

| | | | |
|---|---|---|---|
| 2,810,523 | 10/1957 | Branson | 236/12 R |
| 2,912,994 | 11/1959 | Mori | 137/625.4 |
| 2,998,919 | 9/1951 | Budde | 137/625.4 X |
| 3,388,861 | 6/1968 | Harding | 236/12 R |
| 3,502,103 | 3/1970 | Verschuur | 138/39 X |
| 3,685,728 | 8/1972 | Chapou | 236/12 R |
| 3,765,604 | 10/1973 | Trubert et al. | 236/12 R |
| 3,827,016 | 7/1974 | Knapp | 236/12 R |
| 3,844,476 | 10/1974 | Bales, Sr. | 137/625.4 X |
| 3,929,283 | 12/1975 | Delpla | 236/12 R |

FOREIGN PATENTS OR APPLICATIONS 126,274   9/1949   Sweden ............................... 236/12

Primary Examiner—Irwin C. Cohen
Attorney, Agent, or Firm—Sughrue, Rothwell, Mion, Zinn & Macpeak

[57] ABSTRACT

This valve has a body, in which a cartridge is slidably mounted under the action of a flow rate regulation control member, the inlets for hot water and cold water radially disposed in the lateral wall of the cartridge. According to the invention, this valve comprises in the mixing chamber, defined by the cartridge, two deflectors for converting the radial inlet flows of hot and cold water into axial flows directed towards one another.

7 Claims, 3 Drawing Figures

THERMOSTATIC MIXER VALVE

BACKGROUND OF THE INVENTION

1. Field of the Invention

The present invention relates to a thermostatic mixer valve for mixing hot and cold waters.

2. Description of the Prior Art

Thermostatic mixer valves are known which comprise a body, a cartridge slidably mounted in the body, the body and cartridge each having hot water and cold water inlets and a mixed water outlet, a flow rate regulation control member supported by the body, for moving the cartridge between two positions in one of which communication between the mixed water outlets of the cartridge and body is prevented, a temperature regulation control member supported by the body, and a temperature regulating means including a thermosensitive element connected to the temperature regulation control member for regulating the mixed water temperature by varying the relative proportions of hot and cold water in the mixture. The hot water and cold water inlet flows into the mixing chamber defined by the cartridge are thus radial with respect to the sliding direction of the cartridge. A valve of this type is known from our French Patent Application No. 73.29 442.

It is an object of the present invention to improve the regulation characteristics of such a valve.

SUMMARY OF THE INVENTION

According to the present invention, there is provided a thermostatic mixer valve of the aforesaid type, wherein the cartridge defines a mixing chamber into which the hot and cold water inlets open radially, and two deflectors are located within the mixing chamber so as to deflect the radial inlet flows of hot and cold water into axial flows directed towards each other making it possible to transform the radial hot water and cold water inlet flows into axial flows directed towards each other.

This arrangement makes it possible for the two flows to meet head on and consequently provides better mixing of the flows in the axial direction of the valve. This improves the regulation characteristics, by giving a shorter response time and an improved temperature regulation, and by eliminating fluctuations even in the case of a valve connected in a supply system having variable parameters (rate of flow, pressure, temperature).

In a preferred embodiment of the invention, the temperature regulating means comprises a slide-valve which is secured to the thermostatic element and has ends which co-operate with abutment surfaces provided on the cartridge to define a cold water passage and a hot water passage, the passages being of variable section and the deflectors being located in the region of the passages.

Also, the deflector may be located nearest to the mixed water outlet orifice of the cartridge and defines with the thermostatic element a passage of small cross-section having smooth walls.

An embodiment of the invention will now be described, by way of example, with reference to the accompanying drawings.

DESCRIPTION OF THE PREFERRED EMBODIMENT

Figure 1:
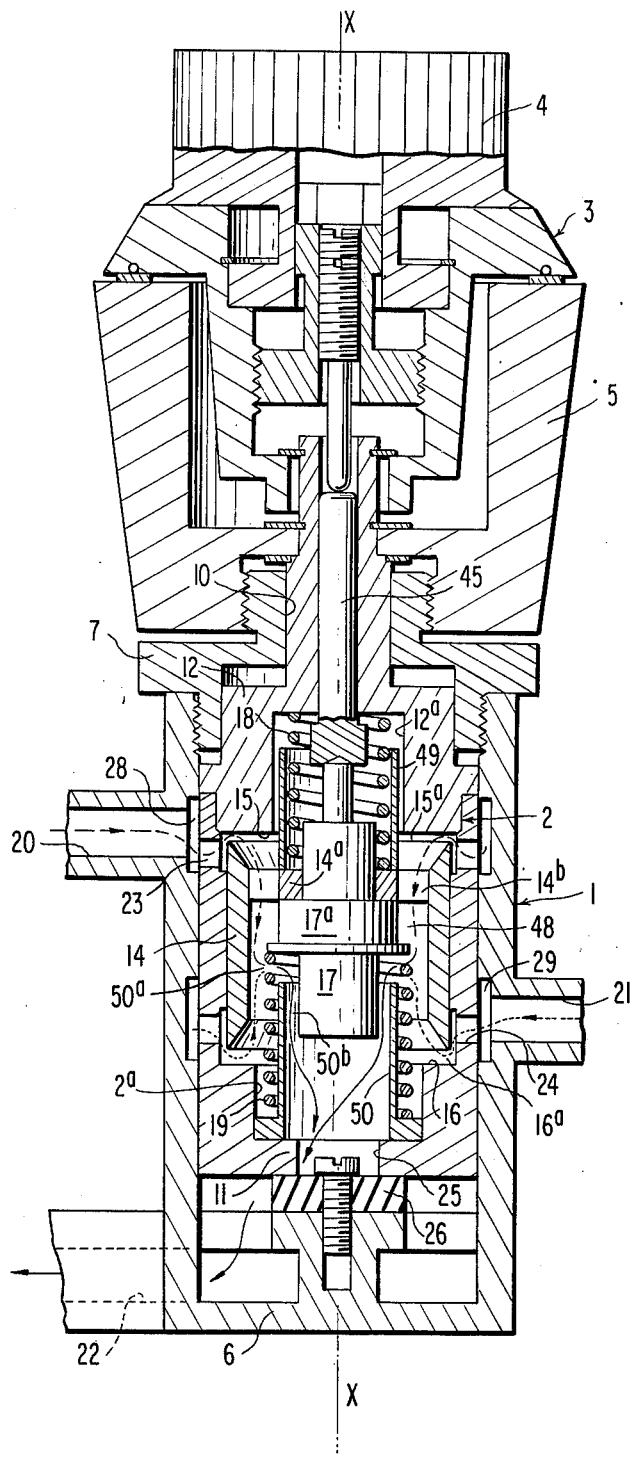
FIG. 1 is a diagrammatic elevation, partially in axial section, of a valve according to the invention.
Figure 2:
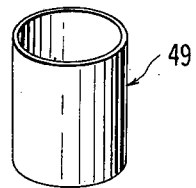
FIGS. 2 and 3 are perspective views of two deflectors incorporated in the valve of FIG. 1.
Figure 3:
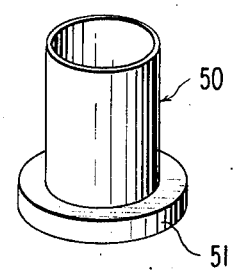

The illustrated valve is generally symmetrical about an axis X—X and comprises a body 1 inside which a cartridge 2 is housed and a head 3 located above the body 1 on the axis X—X, the head 3 supporting a temperature control knob 4 and flow control knob 5.

The body 1 is cylindrical and comprises a base 6 at one end and a cover 7 at its other end, the cover 7 having an axial passage 10 of square or hexagonal section. The cartridge 2 is cylindrical and comprises at one end a base 11 and at its other end a cylindrical and hollow cap 12, the cartridge 1 and the cap 12 being mounted to slide in the body 1 and its cover 7. The cartridge 2 contains a temperature-regulating arrangement constituted by a cylindrical, hollow slide-valve 14 which is axially movable between two abutment surfaces 15 and 16 of the cartridge. The slide valve 14 comprises an inner boss $14^a$ against which a central flange $17^a$ of an axial thermo-sensitive capsule 17 is upwardly pressed. The arrangement of the slide-valve 14 and capsule 17 is subject to the opposing axial action of two helical springs 18 and 19 located one between the underside of the cap 12 and the boss $14^a$ and the other between the flange $17^a$ and the base 11 of the cartridge. The inner diameter of the cylindrical cavity $12^a$ in the cap 12 is slightly greater than the outer diameter of the boss $14^a$ (which is connected to the slide valve 14 by radial arms $14^b$), but relatively smaller than the inner diameter of the slide valve.

The body 1 comprises a radial orifice 20 for the inlet of cold water, a radial orifice 21 for the inlet of hot water, and a radial orifice 22 for the outlet of mixed water 22. The cartridge 2 comprises a radial aperture 23 for the inlet of cold water, a radial aperture 24 for the inlet of hot water and an axial orifice 25 for the outlet of mixed water. The orifice 25 is provided in the base 11 of the cartridge opposite a rubber closure member 26 which is fixed to the base 6 of the body and around which is defined an annular chamber into which opens the mixed water outlet orifice 22 of the body. Annular chambers 28 and 29 in the body facilitate permanent communication between the apertures 23 and 24 of the cartridge with the inlet orifices 20 and 21. As regards the slide-valve 14, its ends define with the abutment surfaces 15 and 16 of the cartridge a cold water passage $15^a$ and a hot water passage $16^a$ whose section varies depending on the position of the slide-valve. A rod 45 which passes axially through the cap 12 of the cartridge and rests on the capsule 17 may be displaced axially by rotation of the temperature regulating knob 4, which makes it possible to vary the position of the cartridge and thus of the slide-valve 14. The structure described hitherto conforms with that of the valve described in our French Patent Application No. 73.29.442.

A mixing chamber 48 is defined by the cartridge and its cap, and two deflectors 49 and 50 are arranged on either side of the central flange $17^a$ of the capsule within the chamber 48. These deflectors are constituted by cylinders having thin and smooth walls disposed in annular regions into which the series of orifices 23 and 24 for the inlet of cold and hot water open. The upper deflector 49 has an outer diameter virtually equal to that of the boss $14^a$ of the slide valve and is fixed at one end to the upper side of this boss. Its other end extends inside the cavity $12^a$ of the cap, its lateral wall surrounding the spring 18 over the major part of its length. One end of the lower deflector 50 comprises an outer flange 51 whose outer diameter is equal to the inner diameter of the cylindrical cavity $2^a$ of the cartridge which extends between its abutment surface 16 and its base 11, whereas the diameter of the cylindrical wall of the deflector is greater than that of the capsule 17. The deflector 50 is fixed by its flange 51 to the base 11 of the cartridge, such that its opposite end defines with the flange $17^a$ of the capsule a radial annular passage $50^a$, its lateral wall also being located inside the spring 19 which thus bears on its flange. The diameters of the deflectors are such that an annular water passage is defined between the outer surface of the lateral wall of the upper deflector 49 and the inner surface of the cavity of the cap 12, and a further annular water passage $50^b$ is defined between the smooth outer surface of the capsule 17 and the lateral wall of the deflector 50. The axial annular passage $50^b$ is sufficiently large for the evacuation of mixed water but is nevertheless as small as possible to make it possible to obtain a maximum flow rate at this point.

The operation of the valve thus described is as follows:

Temperature regulation is achieved by rotating the knob 4, which causes an axial movement of the rod 45 and thermo-sensitive capsule 17 and consequently of the slide-valve 14 on which the latter rests, the slide-valve 14 opening the cold and hot water inlet apertures 23 and 24 respectively in proportion to the movement of the knob 4 in order to obtain a desired mixed water temperature.

Regulation of the rate of flow is achieved by rotation of the control knob 5 which causes an upwards or downwards movement of the cap 12 and of the cartridge 2 which thus slides axially inside the body 1 and moves away from or towards the closure member 26. This movement opens to a greater or lesser extent the annular passage for the mixed water between the closure member and the base 11.

The cold water (path shown in broken lines) arrives through the inlet orifice 20 in the body and the apertures 23 of the cartridge, passes between the slide valve 14 and the abutment surface 15 of the cap and strikes radially against the deflector 49. The latter transforms this radial arrival of cold water into an axial flow directed along the direction of axis X—X and downwards. The cold water which is sent upwards, strikes the base of the cavity of the cap and thus re-descends between the deflector and the inner lateral surface of this cavity to follow the normal downwards flow.

The travel of the hot water (shown in dotted line) takes place in an exactly symmetrical manner through the orfice 21 and the apertures 24 and between the slide-valve 14 and the abutment surface 16 of the cartridge to provide an upwards flow. The flows of cold and hot water meet inside the chamber 48 in a region which may vary depending on the ratio of cold water pressure/hot water pressure, but which is always located in the vicinity of the flange $17^a$ of the capsule. The mixing of the hot and cold water thus takes place perfectly due to the fact that the two axial flows meet head on and the mixed water escapes between the capsule and the inner surface of the deflector 50 in the direction of the mixed water outlet orifice 25 (shown in full line).

In addition to the advantages of speed and simplicity of assembly and disassembly, which can take place without requiring a new calibration of the valve, the afore-described valve has other considerable advantages as regards its regulation characteristics.

In fact, since mixing of hot and cold water takes place between two water flows which meet head on in the direction of the axis X—X, there is intimate mixing and virtually instantaneous homogenisation of the temperature. The response time of the valve is thus extremely low. The passage of the mixed water through the spring 19 also increases the mixing quality by the turbulence effect which it creates. The discharge of mixed water between the capsule 17 and the inside of the deflector 50 finally facilitates an additional mixing and homogenisation stage.

Furthermore, the arrangement of the deflector 50 inside the spring 19 and the minimum section of the passage $50^b$ provided between this deflector and the capsule, which is compatible with the rate of flow required, makes it possible to obtain a high speed laminar flow of small thickness, which results in a limitation of the temperature gradient throughout the depth of the liquid stream and an increase in the quality and speed of thermal exchanges (regulation and response time).

Finally, the presence of deflectors prevents the capsule from being directly affected by contact with hot water and cold water, it being solely the mixed water which covers the capsule, which is thus subject to lesser thermal stresses.

What I claim is:

1. In a thermostatic mixer valve for mixing hot and cold water, said valve including a cylindrical valve body, a cylindrical cartridge slidably mounted in said body, said body and said cartridge each having axially spaced, circumferentially aligned hot water and cold water inlets, a mixed water outlet, an axial flow passage within said cylindrical cartridge leading to said mixed water outlet, a flow rate regulation control member supported by the body for axially shifting said cartridge between two positions in one of which communication between the mixed water outlet of the cartridge and body is prevented, a temperature regulation control member supported by said body, a temperature regulating means including a thermosensitive element connected to said temperature regulation control member for regulating the mixed water temperature by varying the relative proportions of hot and cold water in the mixture, said cartridge defining an annular mixing chamber into which the hot and cold water inlets open radially, said temperature regulating means further comprising a slide valve secured to the thermostatic element and positioned within said mixing chamber, said cartridge further defining axially spaced abutment surfaces facing respective ends of said slide valve and cooperating with the ends of said slide valve to define a cold water passage and a hot water passage respectively leading from said cold and hot water inlets to the interior of said slide valve, the interior of said slide valve being open and forming said axial passage leading to said mixed water outlet of said cartridge, a pair of coil springs acting on opposite sides of said thermostatic element, the improvement comprising: annular, hollow deflectors located within respective ends of said mixing chamber, radially opposite said radial hot water and cold water inlets and radially spaced from said slide valve forming annular flow path therewith and extending axially beyond the ends of said hot and cold water inlets and being axially spaced relative to each other so as to deflect the radial inlet flows of the hot and cold water to axial flows so as to flow towards each other prior to flowing radially between said deflectors via a radial passage therebetween and finally through the center of the mixing chamber within said axial flow passage leading to said mixed water outlet for said cartridge.

2. A thermostatic mixer valve according to claim 1, wherein the deflector located nearest to the mixed water outlet of said cartridge defines with said slide valve a passage of relatively small cross-section having smooth walls.

3. A thermostatic mixer valve according to claim 1, wherein said deflectors comprise cylinders concentrically surrounding but radially spaced from said thermostatic element.

4. A thermostatic mixer valve according to claim 3, wherein said deflector cylinder located closest to the mixed water outlet of said cartridge is of thin wall construction, arranged coaxially with said cartridge, and defining an axial passage leading from said thermostatic element to said mixed water outlet.

5. A thermostatic mixer valve according to claim 4, wherein said thermostatic element includes a radial flange intermediate of its axial ends, said deflector cylinder remote from said mixed water outlet for said cartridge is formed of thin wall construction and is mounted on said thermostatic element flange, both deflector cylinders having the same diameter as said flange, and said coil springs being mounted concentrically and bearing on respective sides of said flange and coaxial with respect to respective cylinders.

6. A thermostatic mixer valve according to claim 4, wherein said deflector cylinder located closest to the mixed water outlet of said cartridge is fixed to the interior of said cartridge and defines said radial passage with said thermostatic element flange.

7. A thermostatic mixer valve according to claim 3, wherein the coil spring which is located closest to said mixed water outlet is concentrically arranged about the deflector cylinder at that end of the mixing chamber with said coil spring extending through said radial passage.

* * * * *